(12) United States Patent
Subramanian et al.

(10) Patent No.: US 11,678,202 B2
(45) Date of Patent: Jun. 13, 2023

(54) QCL INDICATION BY UE-BEAM BASED TAGGING

(71) Applicant: QUALCOMM Incorporated, San Diego, CA (US)

(72) Inventors: Sundar Subramanian, San Diego, CA (US); Juergen Cezanne, Ocean Township, NJ (US); Bilal Sadiq, Basking Ridge, NJ (US); Ashwin Sampath, Skillman, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 16/009,034

(22) Filed: Jun. 14, 2018

(65) Prior Publication Data

US 2018/0368004 A1 Dec. 20, 2018

Related U.S. Application Data

(60) Provisional application No. 62/521,308, filed on Jun. 16, 2017.

(51) Int. Cl.
*H04W 16/28* (2009.01)
*H04B 7/06* (2006.01)
*H04B 7/08* (2006.01)
*H04B 17/309* (2015.01)

(52) U.S. Cl.
CPC ............ *H04W 16/28* (2013.01); *H04B 7/063* (2013.01); *H04B 7/0695* (2013.01); *H04B 7/088* (2013.01); *H04B 17/309* (2015.01)

(58) Field of Classification Search
CPC ..... H04W 16/28; H04B 7/0695; H04B 7/088; H04B 7/063; H04B 17/309
See application file for complete search history.

(56) References Cited

U.S. PATENT DOCUMENTS

| | | | |
|---|---|---|---|
| 2013/0301454 A1 | 11/2013 | Seol et al. | |
| 2016/0353510 A1 | 12/2016 | Zhang et al. | |
| 2017/0104517 A1* | 4/2017 | Kakishima | H04B 7/0456 |
| 2019/0387478 A1* | 12/2019 | Sundin | H04W 52/146 |

FOREIGN PATENT DOCUMENTS

| | | |
|---|---|---|
| CN | 104303477 A | 1/2015 |
| WO | 2016127403 A1 | 8/2016 |

OTHER PUBLICATIONS

International Search Report and Written Opinion—PCT/US2018/037819—ISA/EPO—dated Sep. 13, 2018.
(Continued)

*Primary Examiner* — Kabir A Timory
(74) *Attorney, Agent, or Firm* — Patterson + Sheridan, L.L.P.

(57) ABSTRACT

A UE my receiving an indication of a beam pair link (BPL), wherein the BPL comprises a base station (BS) transmit beam and a corresponding UE receive beam. The UE may tag the BPL based on the UE receive beam. The UE may take one or more actions associated with the tagged BPL.

30 Claims, 13 Drawing Sheets

(56) References Cited

OTHER PUBLICATIONS

Ericsson: "Beam Management Details", 3GPP Draft, R1-1705891, 3GPP TSG-RAN WG1 #88bis, 3rd Generation Partnership Project (3GPP), Mobile Competence Centre, 650,Route Des Lucioles, F-06921 Sophia-Antipolis Cedex France, vol. RAN WG1, No. Spokane, WA, USA, Apr. 3, 2017-Apr. 7, 2017, Apr. 2, 2017 (Apr. 2, 2017), XP051244002, pp. 1-5, Retrieved from the Internet: URL:http://www.3gpp.org/ftp/Meetings_3GPP_SYNC/RAN1/Docs/ [retrieved on Apr. 2, 2017].

Ericsson: "DL Beam Management Details", 3GPP Draft, R1-1708676, 3GPP TSG-RAN WG1 #89, 3rd Generation Partnership Project (3GPP), Mobile Competence Centre, 650,Route Des Lucioles, F-06921 Sophia-Antipolis Cedex, France, vol. RAN WG1, No. Hangzhou, China, May 15, 2017-May 19, 2017, May 14, 2017 (May 14, 2017), XP051273859, pp. 1-5, Retrieved from the Internet: URL:http://www.3gpp.org/ftp/Meetings_3GPP_SYNC/RAN1/Docs/ [retrieved on May 14, 2017].

CATT: "Discussion on DL Beam Management", 3GPP TSG RAN WG1 Meeting #89, 3GPP Draft, R1-1707475, 3rd Generation Partnership Project (3GPP), Mobile Competence Centre; 650, Route Des Lucioles, F-06921 Sophia-Antipolis Cedex; France, vol. RAN WG1, No. Hangzhou, China, May 15, 2017-May 19, 2017, May 14, 2017 (May 14, 2017), XP051272683, 10 pages, figure 3 p. 5.

Ericsson: "DL Beam Management Overview", 3GPP TSG-RAN WG1 #87ah-NR, R1-1700763, Spokane, WA, USA, Jan. 16-20, 2017, XP051208287, pp. 1-4.

Samsung: "Discussion on Beam Grouping", 3GPP TSG RAN WG1 #87, R1-1612517, 3rd Generation Partnership Project, Mobile Competence Centre, 650, Route Des Lucioles, F-06921 Sophia-Antipolis Cedex, France, vol. RAN WG1, No. Reno, USA, Nov. 14, 2016-Nov. 18, 2016 Nov. 4, 2016, XP051189629, 4 Pages.

* cited by examiner

800

BPL tags after discoveries and deletion

| No. | Action | BPL | | Tag (after action) | Comment |
|---|---|---|---|---|---|
| | | BS-beam (after action) | UE-beam (after action) | | |
| 1 | Discovery | 1 | 2 | 0 | |
| 2 | Discovery | 3 | 4 | 1 | |
| 3 | Discovery | 5 | 2 | 0 | Same tag as BPL (1, 2) due to same UE-beam |
| 4 | Deletion of BPL with tag 1 | 3 | 4 | - | BPL (3, 4) is now untagged and is no more immediately available |
| 5 | Discovery | 8 | 3 | 1 | |

BPL tags after P2 procedure

| No. | Action | BPL | | Tag (after action) | Comment |
|---|---|---|---|---|---|
| | | BS-beam (after action) | UE-beam (after action) | | |
| 1 | Discovery | 1 | 2 | 0 | |
| 2 | Discovery | 3 | 4 | 1 | |
| 3 | Discovery | 5 | 2 | 0 | Same tag as BPL (1, 2) due to same UE-beam |
| 4 | P2 of BPL (3,4) with tag 1 | 6 | 4 | 1 | Update of BS-beam |
| 5 | P2 of BPL (1,2) with tag 0 | 7 | 2 | 0 | Update of BS-beam |

FIG. 9

QCL INDICATION BY UE-BEAM BASED TAGGING

CROSS-REFERENCE TO RELATED APPLICATIONS

This application claims benefit of priority from commonly-owned U.S. Provisional Application Ser. No. 62/521,308, filed Jun. 16, 2017, which is expressly incorporated herein by reference in its entirety.

INTRODUCTION

Aspects of the present disclosure relate to wireless communications, and more particularly, quasi co-location (QCL) indication based on UE beam tagging.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a UE. The method includes receiving an indication of a beam pair link (BPL), wherein the BPL comprises a base station (BS) transmit beam and a corresponding UE receive beam, tagging the BPL based on the UE receive beam, and taking one or more actions associated with the tagged BPL.

Certain aspects of the present disclosure provide a method for wireless communication that may be performed, for example, by a BS. The method includes transmitting an indication of a beam pair link (BPL), wherein the BPL comprises a BS transmit beam and a corresponding user equipment (UE) receive beam, receiving an indication of a tag assigned to the BPL based on the UE receive beam, and taking one or more actions associated with the tagged BPL.

Certain aspects of the present disclosure provide an apparatus for wireless communication that may be performed, for example, by a UE. The apparatus includes means for receiving an indication of a beam pair link (BPL), wherein the BPL comprises a base station (BS) transmit beam and a corresponding UE receive beam, means for tagging the BPL based on the UE receive beam, and means for taking one or more actions associated with the tagged BPL.

Certain aspects of the present disclosure provide an apparatus for wireless communication that may be performed, for example, by a BS. The apparatus includes means for transmitting an indication of a beam pair link (BPL), wherein the BPL comprises a BS transmit beam and a corresponding user equipment (UE) receive beam, means for receiving an indication of a tag assigned to the BPL based on the UE receive beam, and means for taking one or more actions associated with the tagged BPL.

Certain aspects of the present disclosure provide an apparatus for wireless communication that may be performed, for example, by a UE. The apparatus includes at least one processor and a memory coupled to the at least one processor. The at least one processor is configured to receive an indication of a beam pair link (BPL), wherein the BPL comprises a base station (BS) transmit beam and a corresponding UE receive beam, tag the BPL based on the UE receive beam, and take one or more actions associated with the tagged BPL.

Certain aspects of the present disclosure provide an apparatus for wireless communication that may be performed, for example, by a BS. The apparatus includes at least one processor and a memory coupled to the at least one processor. The at least one processor is configured to transmit an indication of a beam pair link (BPL), wherein the BPL comprises a BS transmit beam and a corresponding user equipment (UE) receive beam, receive an indication of a tag assigned to the BPL based on the UE receive beam, and take one or more actions associated with the tagged BPL.

Certain aspects of the present disclosure provide a computer readable medium storing computer executable instructions thereon for causing a UE to receive an indication of a beam pair link (BPL), wherein the BPL comprises a base station (BS) transmit beam and a corresponding UE receive beam, tag the BPL based on the UE receive beam, and take one or more actions associated with the tagged BPL.

Certain aspects of the present disclosure provide a computer readable medium storing computer executable instructress thereon for causing a BS transmit an indication of a beam pair link (BPL), wherein the BPL comprises a BS transmit beam and a corresponding user equipment (UE) receive beam, receive an indication of a tag assigned to the BPL based on the UE receive beam, and take one or more actions associated with the tagged BPL.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 illustrates example of updated BPL tags after discovery and deletion, in accordance with certain aspects of the present disclosure.

FIG. 9 illustrates example of BPL tags after P2, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
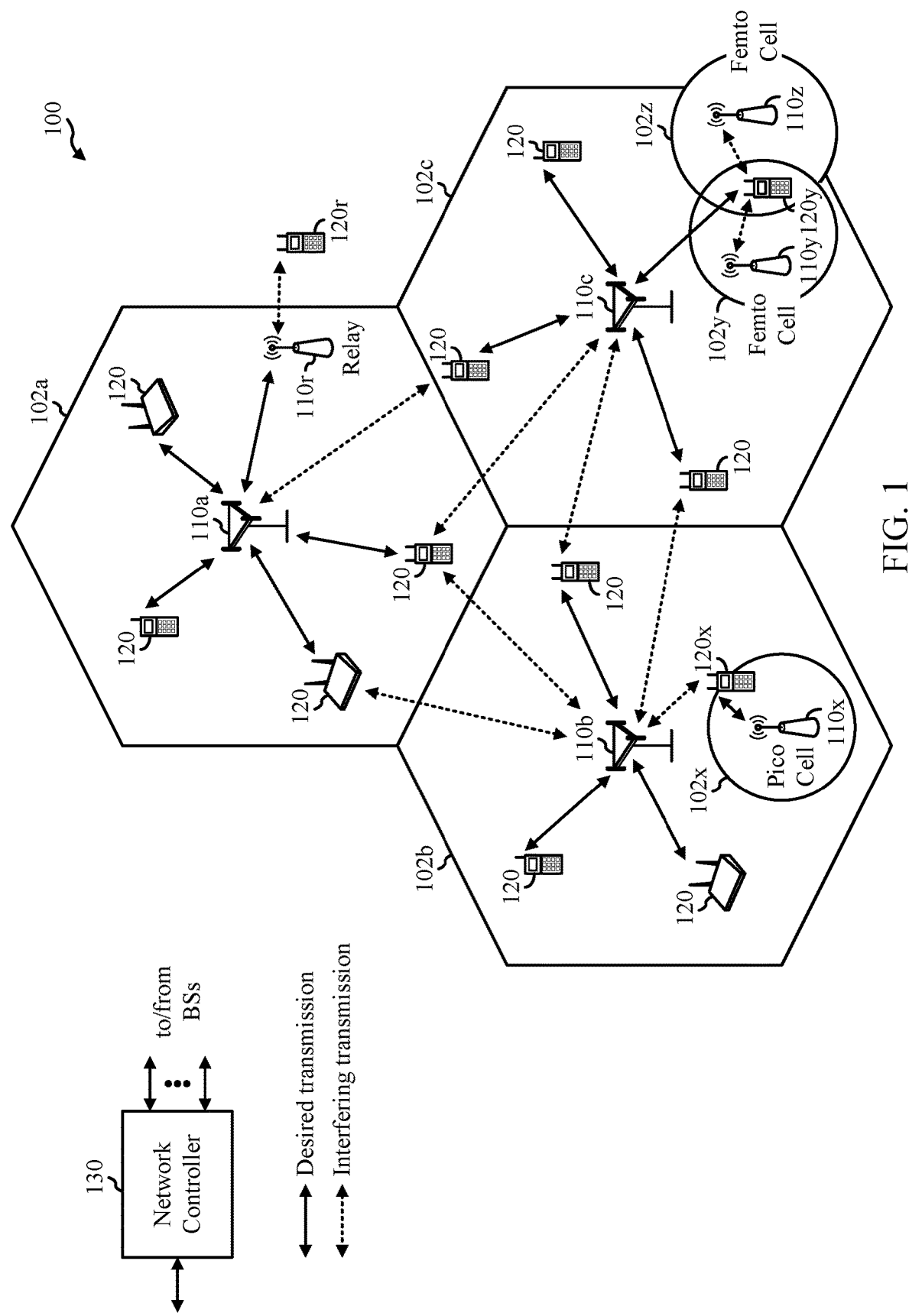
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

mmW communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

Spectrum bands in high frequencies (e.g., 28 GHz, may be referred to as mmW (or mmWave)) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmW operate, small wavelengths enable a large number of antenna elements in a relatively small form factor. Unlike microwave links, which may cast very wide footprints, reducing the achievable amount of reuse of the same spectrum within a geographical area, mmW links cast very narrow beams (for example, beams may have a narrow angle). This characteristic of mmW may be leveraged to form directional beams that may send and receive more energy to overcome propagation and path loss challenges.

These narrow directional beams can also be utilized for spatial reuse. This is one of the key enablers for utilizing mmW for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly vital to transmit signals in the appropriate direction, in an effort to maximize the received signal energy at the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

Figure 7:
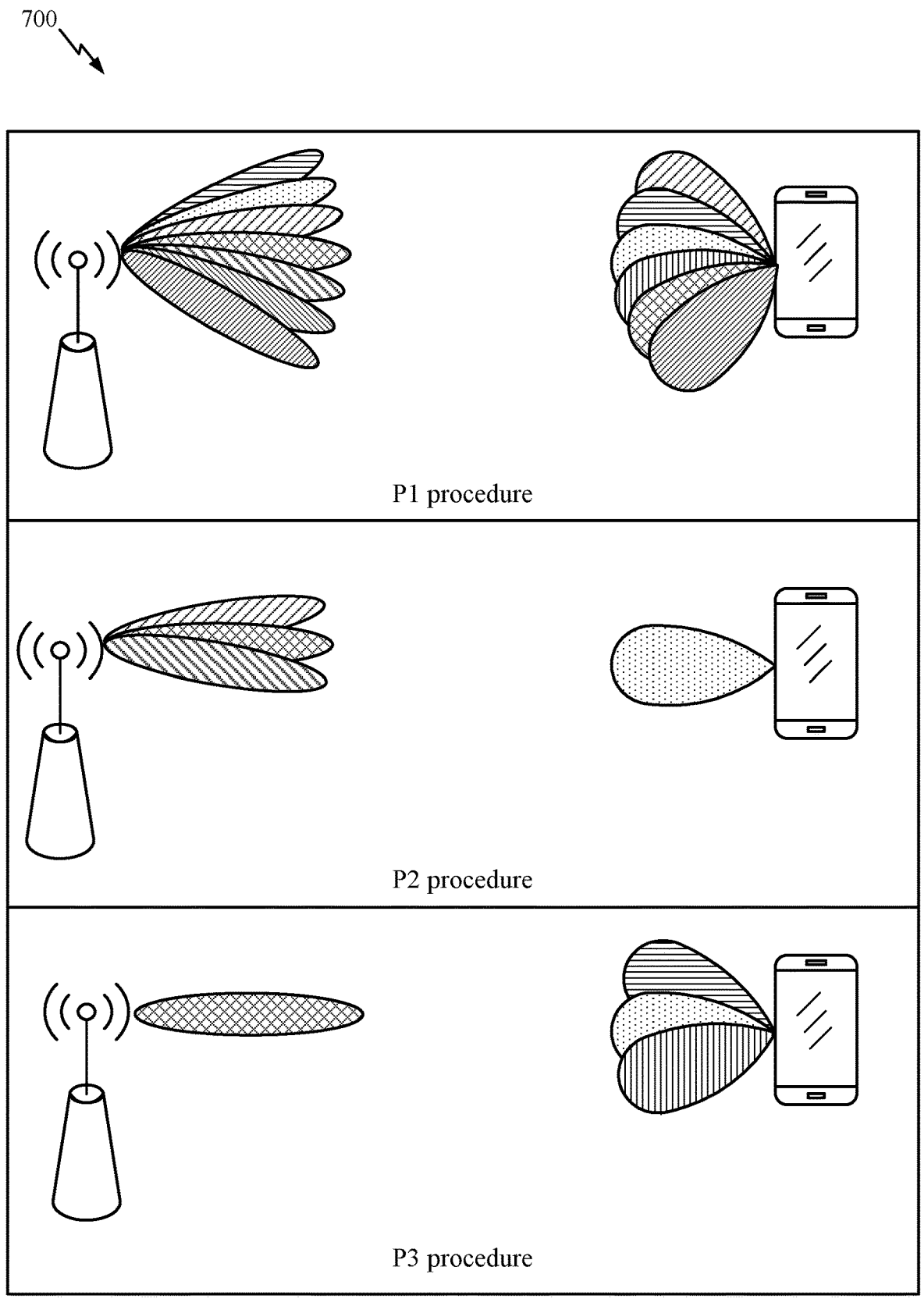
FIG. 7 illustrates an example of a P1, P2, and P3 procedure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 7. A receiving entity may use receiver beamforming to receive the transmitted signaling.

UEs 120 may be configured to perform the operations 1100 and methods described herein for UE beam-based tagging. BS 110 may comprise a transmission reception point (TRP), Node B (NB), 5G NB, access point (AP), new radio (NR) BS, Master BS, primary BS, etc.). The NR network 100 may include the central unit. The BS may be configured to perform the operations 1200 and methods described herein for UE beam-based tagging.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
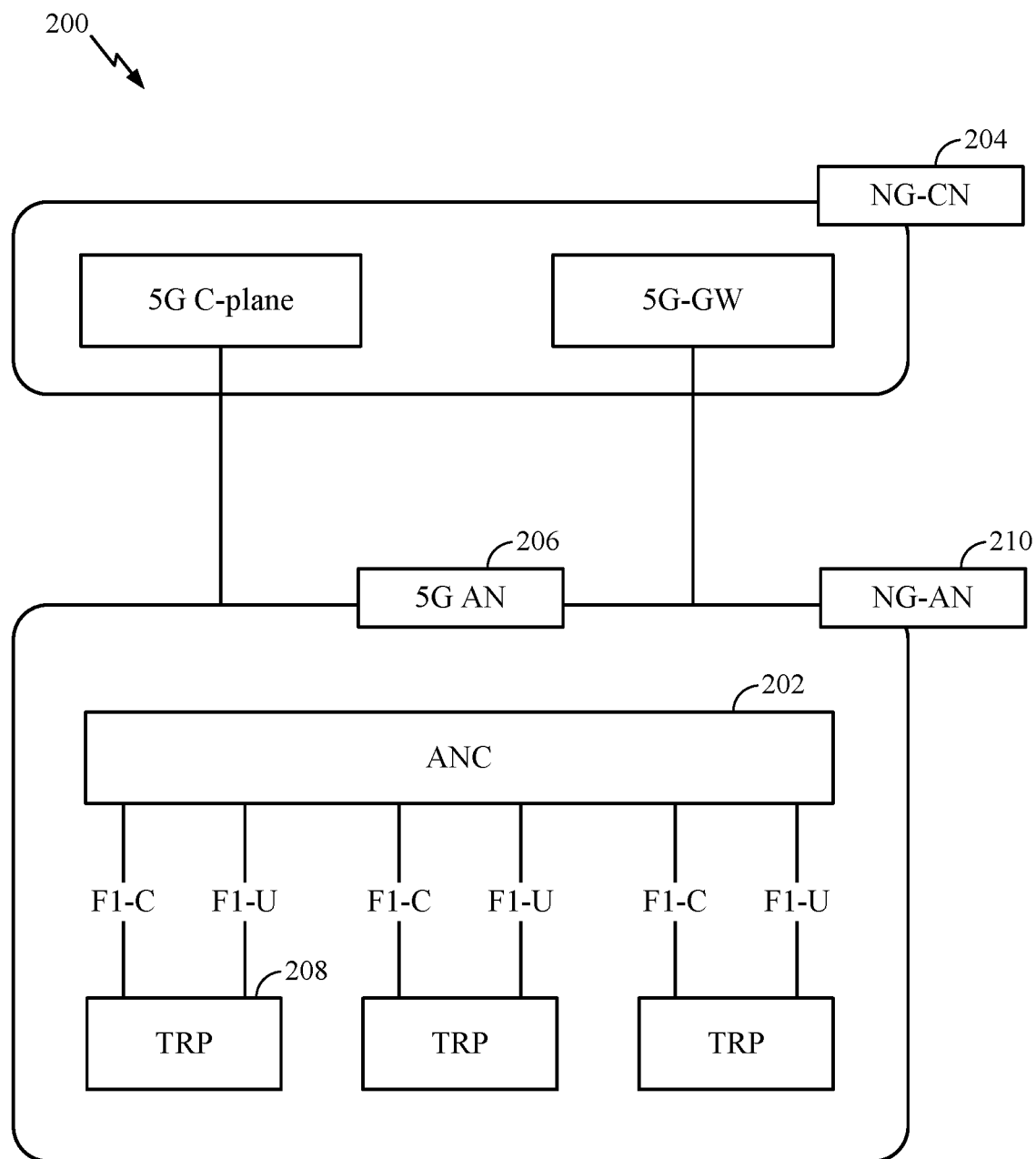
FIG. 2 is a block diagram illustrating an example logical architecture of a distributed RAN, in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
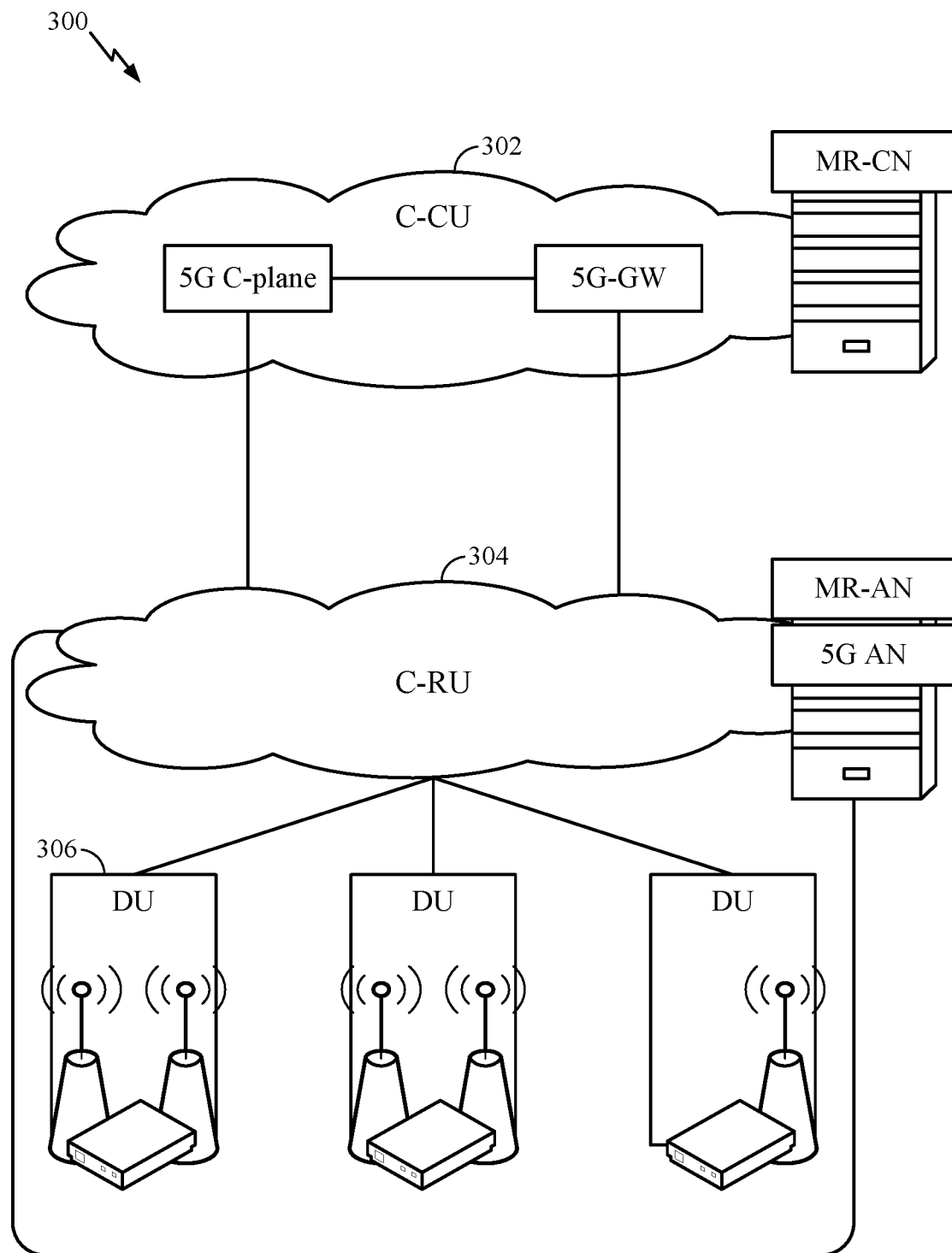
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
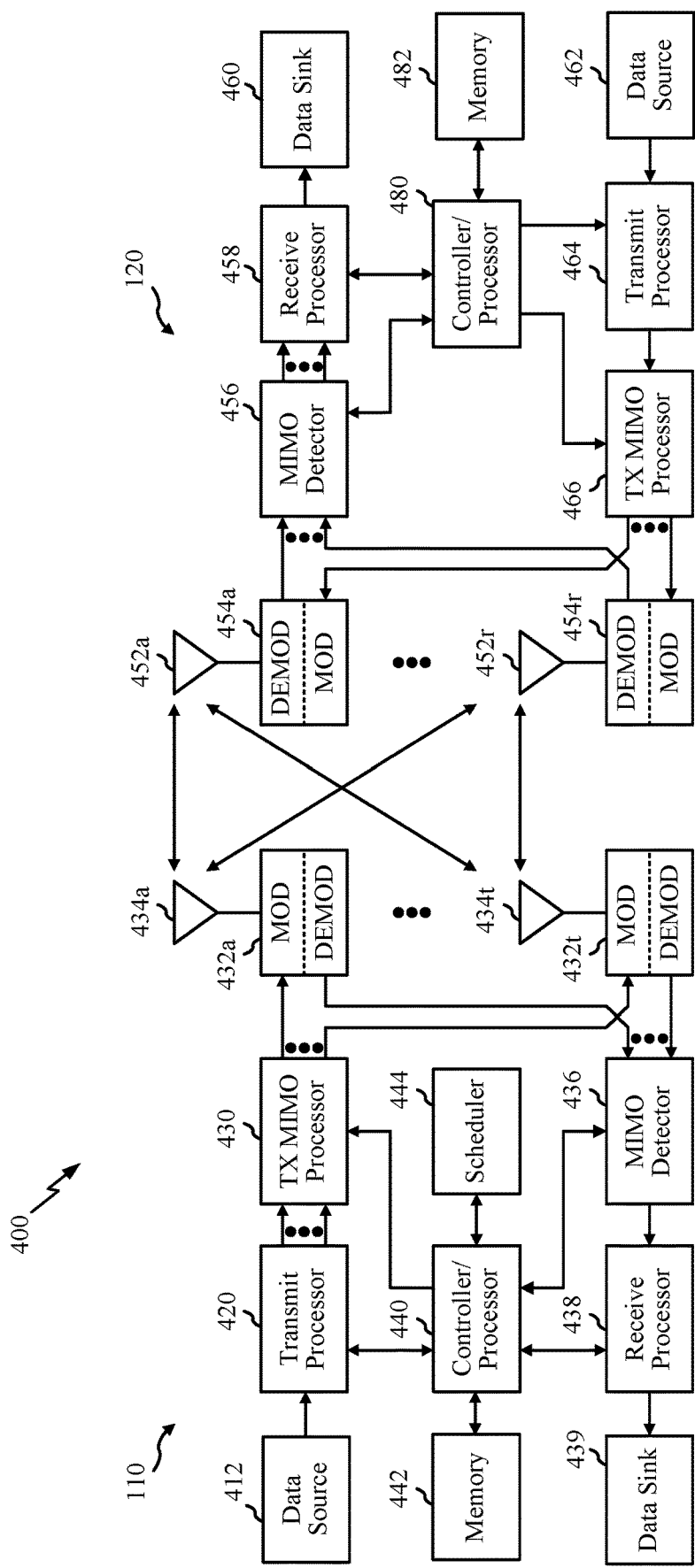
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 7-12. According to an example, antennas 434, DEMOD/MOD 432, processors 430, 420, 438 and/or controller/processor 440 of the BS 110 may be used to perform the operations described herein and illustrated with reference to FIGS. 11-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
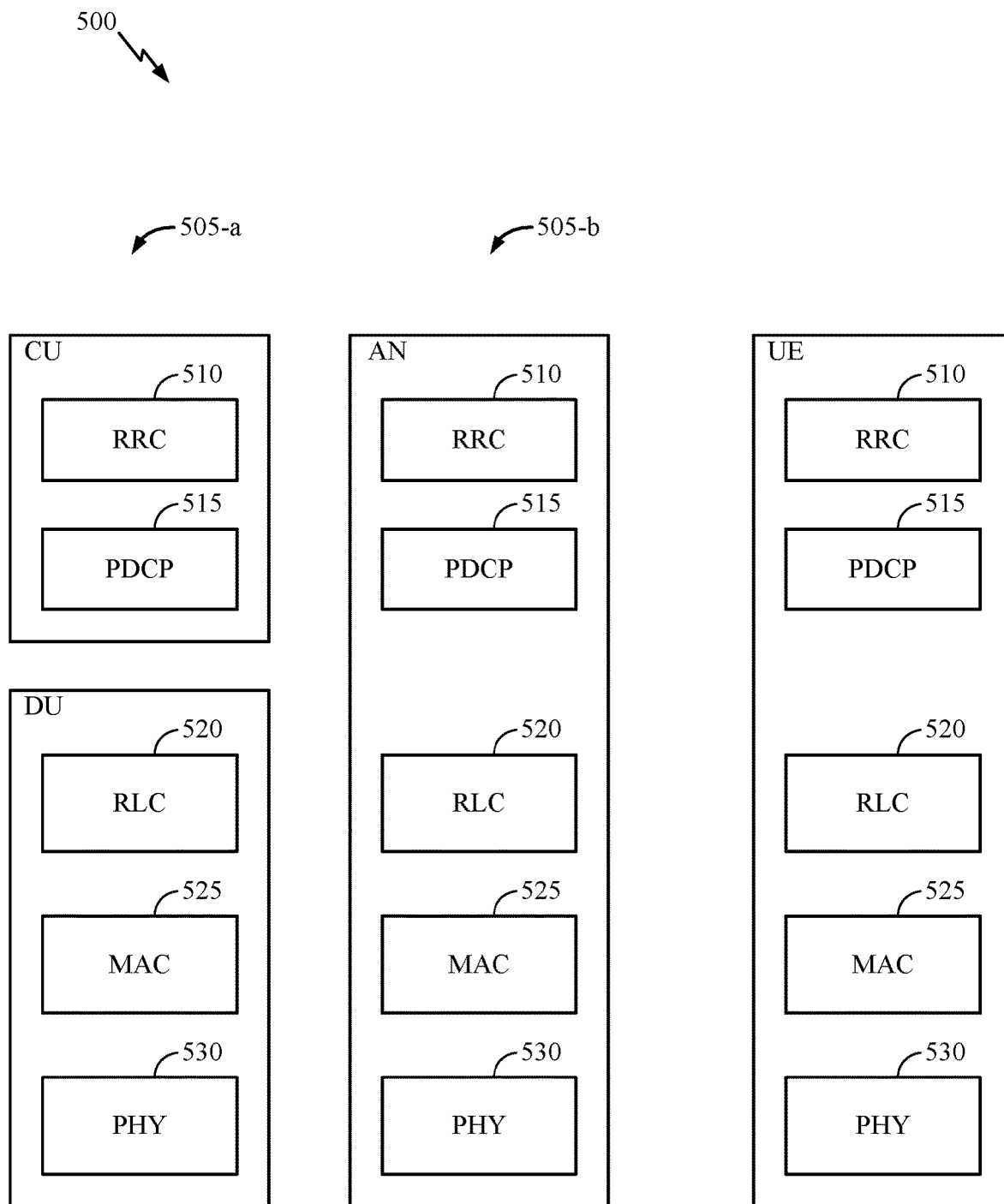
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
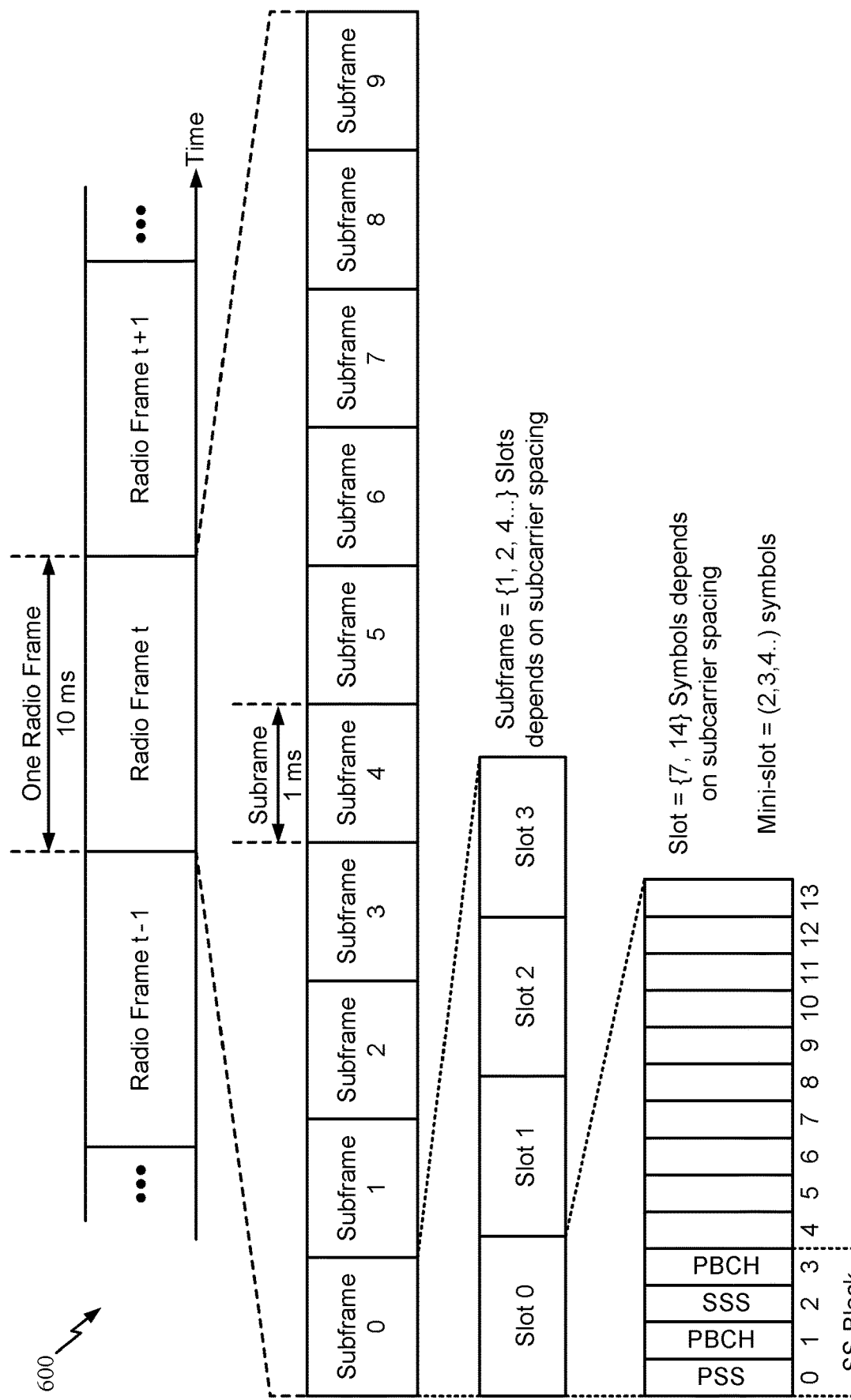
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols). A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE BEAM PROCEDURE

As noted above, in millimeter wave (mmW) cellular systems, beam forming may be needed to overcome high path-losses. As described herein, beamforming may refer to establishing a link between a BS and UE, wherein both of the devices form a beam corresponding to each other. Both the BS and the UE find at least one adequate beam to form a communication link. A BS-beam and UE-beam form what is known as a beam pair link (BPL). As an example, on the DL, a BS may use a transmit beam and a UE may use a receive beam corresponding to the BS transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL may be periodically updated or refined. Accordingly, it may be beneficial if the BS and the UE monitor beams and new BPLs.

At least one BPL has to be established for network access. As described above, new BPLs may need to be discovered later on for different purposes. The network may decide to use different BPLs for different channels, for communicating with different BSs (TRPS), or as fall-back in case an existing BPL fails.

The UE typically monitors the quality of a BPL and the network may refine a BPL from time to time.

FIG. 7 illustrates example 700 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 7 the TRP transmits different symbols of a reference signal, each beam formed in a different spatial direction such that several (most, all) relevant places of the cell are reached. Stated otherwise, the TRP transmits beams using different transmit beams over time in different directions.

For successful reception of at least a symbol of this "P1-signal", the UE has to find an appropriate receive beam. It searches using its available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the TRP the time at which it observed the signal having a high RSRP. The TRP may receive this report and may determine which TRP beam it used at the given time.

The TRP may then offer P2 and P3 procedures to refine an individual BPL. The P2 procedure refines the TRP-beam of a BPL. The TRP may transmit a few symbols of a reference signal with different TRP-beams that are spatially close to the TRP-beam of the BPL (the TRP performs a sweep using neighboring beams around the selected beam). In P2, the UE keeps its receive beam constant. Thus, while the UE uses the same beam as in the BPL (as illustrated in P2 procedure in FIG. 7). The TRP-beams used for P2 may be different from those used in P1 in that they may be spaced closer together or they may be more focused. The UE may measure the RSRP for the various TRP-beams and indicate the best one to the TRP.

The P3 procedure refines the UE-beam of a BPL (see P3 procedure in FIG. 7). While the TRP-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the TRP.

Overtime, the TRP and UE establish several BPLs. When the TRP transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the TRP may indicate for a scheduled signal (SRS, CSI-RS) or channel (PDSCH, PDCCH, PUSCH, PUCCH) which BPL is involved. In NR this information is called QCL indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The TRP may use a BPL which the UE has used to receive a signal in the past. The transmit beam for the signal to be transmitted and the previously-received signal both point in a same direction or are QCL. The QCL indication may be needed by the UE (in advance of signal to be received) such that the UE may use a correct corresponding receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

EXAMPLE UE-BEAM BASED TAGGING

In accordance with aspects of the present disclosure, a QCL indication or tag which is a function of the UE-beam of the BPL is used. Thus, two BPLs which have different BS-beams but the same UE-beam may be labeled by the same tag. The BS may keep a table that contains the set of all BS-beams that are mapped to the same BPL tag (e.g., mapped to the same UE-beam). Advantageously, these BS-beams offer flexibility to the BS. For example, for downlink transmission, the BS may switch between BS-beams associated with a same tag without having to signal a message to the UE. This allows for very fast switching by the BS, which may be advantageous, for example, in the scenario of sudden beam failure. Further, for downlink communication, the BS may use BS-beams associated with a same tag for MIMO transmission with transmit diversity. According to an example, the BS may simultaneously transmit signals on multiple beams mapped to a same tag to achieve transmit diversity gain.

Figure 10:
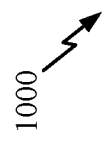
FIG. 10 illustrates an example of updated BPL tags after P3, in accordance with certain aspects of the present disclosure.

FIGS. 8-10, which illustrate Tables 1-3, describe an example of using UE-beam based tagging. The UE is configured to transmit reports about BS-beam measurements for reference signals used for a P1 procedure. The UE reports only BS-beams it receives with a satisfactory RSRP (for example, RSRP >threshold value, or a configurable number of beams associated with a highest RSRP). Each reported item constitutes a BPL.

While in principle all reported BS-beams and the corresponding UE-beams may be candidates for BPLs, the BS may decide which beams to pursue further. The BS signals to the UE, if and which reported items are new BPLs (e.g., 1 bit per new BPL). The BS may also signal the tags of BPLs it no longer wants to use. The UE may receive this report and determine if each BPL has a same of different UE-beam and a BPL identified in the active pool. If BPLs have a same UE-beam, the UE may use a same tag with the BPLs. BPLs having a different UE-beam may use a different tag.

Thereafter, and as will be described in more detail with reference to FIGS. 8-10, the UE signals to the BS the tags for the newly identified BPLs. If two or more BPLs are best received by the same UE-beam, they may be labeled by the same tag. In this manner, if a new BPL and an established BPL are associated with the same UE-beams, the new BPL is assigned the same tag of the established BPL.

FIG. 8 illustrates an example 800 of BPL tags after discovery and deletion, according to aspects of the present disclosure. As shown in line 1, after discovery, the UE knows it used UE-beam 2 to receive a signal. The UE may not know that BS used BS-beam 1. The UE may report receiving a signal using UE-beam 2 at a specific time. Assuming the BS would like to consider this BPL, the UE may assign the BPL as tag 0. Next, as shown in line 2, in discovery, the UE knows it used beam 4 to receive a signal at a certain time. The UE may not know that the BS used beam 3. If the BS would like to consider this BPL, the UE may assign it tag 1. Because the UE beams are different in line 2 as compared to line 1, the tags are different.

Next, as shown in line 3, the UE may receive a signal using beam 2. The UE may transmit this information to the BS. Because UE beam 2 was also used to receive BS-beam 1 in line 1, the BS will tag BPL (5, 2) of line 3 with tag 0, similar to line 1, which also used UE-beam 2. In this manner, two BPLs having the same UE-beam are assigned a same tag.

At a later point, the BS may decide that it may no longer want to pursue the BPL (3, 4) as shown in line 4. The BS may transmit a message to the UE to delete this tag. Accordingly BPL (3, 4) may not be associated with a tag 1. Assuming tag 1 is not associated with another BPL, the tag is available for reuse with another BPL based on the UE-beam. Accordingly, tag 1 is available for the BPL (8, 3) as shown in line 5.

According to aspects, it is possible to reduce the amount of signaling, by instructing the UE to send a message only if a new BPL and either another new BPL or an established BPL share the same UE-beam. This may be possible, since in all other cases, each new BPL will be assigned a new tag. Both, the BS and the UE know which tags are in use for labeling BPLs. There is a pool of unused tags and the airlink specification may outline in which order tags from the pool of unused tags are assigned to new BPLs. The BS may predict which tags the UE may assign to the new BPLs and hence there is no need for the UE to signal that information.

FIG. 9 illustrates an example 900 of BPL tags after the P2 procedure, according to aspects of the present disclosure. The DCI for the P2 procedure may contain the tag of the BPL for which the BS-beam is going to be refined. After the P2 sweep, the UE indicates the best BS-beam and the associated RSRP. The procedure updates the BS-beam of the BPL while the UE-beam remains the same. The tag associated with the (updated) BPL remains the same. Table 2 illustrates an example. As shown in line 4, after P2 on BPL (3, 4), the UE may determine that a symbol transmitted via BS-beam 6 is a better beam as compared to BS-beam 3. The new, improved BPL will be (6, 4). Notably, the same UE beam is used for this BPL, so the tag (tag 1) remains the same despite the change in the BS beam.

As shown in line 5, after P2 on BPL (1, 2), the BS-beam may be updated from 1 to 7. The BS may receive an indication that a symbol transmitted via BS-beam 7 is a better than BS beam 1. The BS may update the BS-beam associated with tag 0 to be BS-beam 7.

FIG. 10 illustrates an example 1000 of BPL tags after the P3 procedure. The DCI for the P3 procedure will contain the tag of the BPL for which the UE-beam is going to be refined. During the P3 sweep, the UE evaluates the performance of different UE-beams while the BS-beam remains constant. If the current UE-beam is still the best, nothing changes. The UE does not need to signal anything to the BS.

However, if another UE-beam turns out to better than the current UE-beam, then two cases may be differentiated. In the first case, the UE associates the tag with only one BS-beam. In this case, the tag of the updated BPL can stay the same. The updated BPL consists of the new UE-beam and the current BS-beam. The UE may not need to signal anything to the BS, except perhaps the RSRP for the updated BPL.

In the second case, the UE associates the tag with more than one BS-beam. In this case, the updated BPL consists of the new UE-beam and the BS-beam used for the P3 procedure. This BPL needs to be labeled with a new tag since it is now different from the other BPLs consisting of the old UE-beam and one of the remaining BS-beams. The UE will report the new tag to the BS.

It is clear that the UE has no way of knowing whether the BS associates more than one BS-beam with the same BPL tag. Therefore, a "new tag request bit" may be included in the DCI for a P3 procedure. It conveys to the UE whether a new tag needs to be issued in case the UE-beam needs to be updated. Table 3 illustrates an example.

As shown on line 4, the BS may enable a P3 procedure on BPL (3, 4). The BS keeps beam 3 constant and the UE uses different beams around UE-beam 4. The UE determines that beam 5 is better than beam 4. The tag for the new BPL (3, 5) may still be the same because the tag 1 was previously associated with a single BS-beam 3. Accordingly, the new tag request may be set to 0.

As shown on line 5, the BS may enable a P3 procedure on BPL (1, 2). The UE may determine UE-beam 3 is better than UE-beam 2. Accordingly BPL (1, 2) may be replaced with BPL (1, 3). In response to the updated UE-beam, the new tag request may be set to 1. This is because BPL (1, 2) and (BPL (5, 2) were previously associated with tag 0. Stated otherwise, the new tag request is set to 1 because the tag 0 was associated with two different BS-beams. BPL (1, 2) is updated, because of P3, to BPL (1, 3). A new tag is needed to so that each BPL tag is associated with a same UE-beam. Accordingly, the updated BPL (1, 3) may be associated with tag 2.

Figure 11:
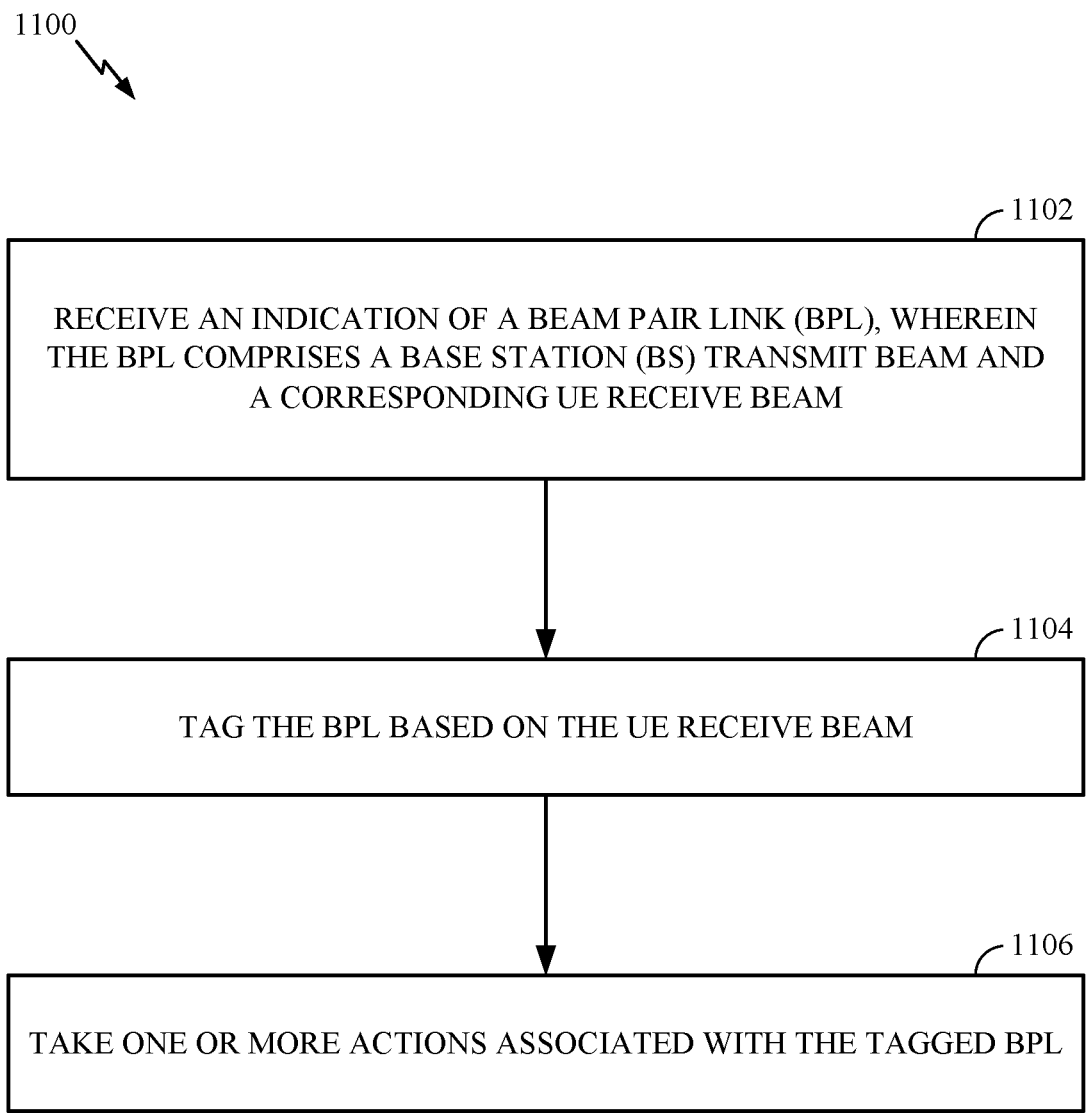
FIG. 11 illustrates an example operations performed by a UE, in accordance with aspects of the present disclosure.

FIG. 11 illustrates example operations 1100 which may be performed by a UE in accordance with aspects of the present disclosure. At 1102, the UE may receive an indication of a beam pair link (BPL), wherein the BPL comprises a base station (BS) transmit beam and a corresponding UE receive beam. At 1104, the UE may tag the BPL based on the UE receive beam. At 1106, the UE may take one or more actions associated with the tagged BPL.

According to aspects, taking the one or more actions includes transmitting, to the BS, an indication of the tagged BPL. Additionally or alternatively, according to aspects, taking the one or more actions includes receiving signaling in accordance with the BPL.

Additionally or alternatively, taking the one or more actions includes receiving a downlink transmission indicating beam refinement of the BS transmit beam of the tagged BPL, for example, during the P2 procedure. During the refinement, the UE may receive signaling, transmitted from one or more neighboring beams of the BS transmit beam, using a single UE receive beam, the UE may determine a signal quality associated with transmissions from one or more of the neighboring beams of the BS transmit beam, and indicate to the BS a recommended BS transmit beam corresponding to the UE receive beam of the tagged BPL based, at least in part, on the determined signal quality.

Additionally or alternatively taking the one or more actions includes receiving a downlink transmission indicating beam refinement of the UE receive beam of the tagged BPL, such as during a P3 procedure. During the refinement, the UE may receive signaling from the BS transmit beam via one or more receive beams neighboring the corresponding UE receive beam of the BPL, may determine a signal quality associated with one or more of the neighboring beams of the UE receive beam, and update the UE receive beam corresponding to the BS transmit beam of the tagged BPL based at least in part, on the determined signal quality. According to aspects, the UE may determine whether a different tag is needed in response to the updated UE receive beam. If a different tag is needed, the UE may compute the different tag, indicate the different tag to the BS, and assign the different tag to the updated UE receive beam and BS transmit beam. According to aspects, the different tag includes one of: a new tag or a currently-used tag.

According to aspects, taking the one or more actions associated with the tagged BPL includes transmitting, to the BS, an indication of the tagged BPL in response to at least one of: a new BPL or an established BPL sharing a same UE receive beam with the new BPL. Additionally or alternatively, taking one or more actions associated with the tagged BPL includes receiving, from the BS, a message to remove a tag and its current association to one or more BPLs and in response to the message, making the removed tag available for assignment to one or more new BPLs.

Figure 12:
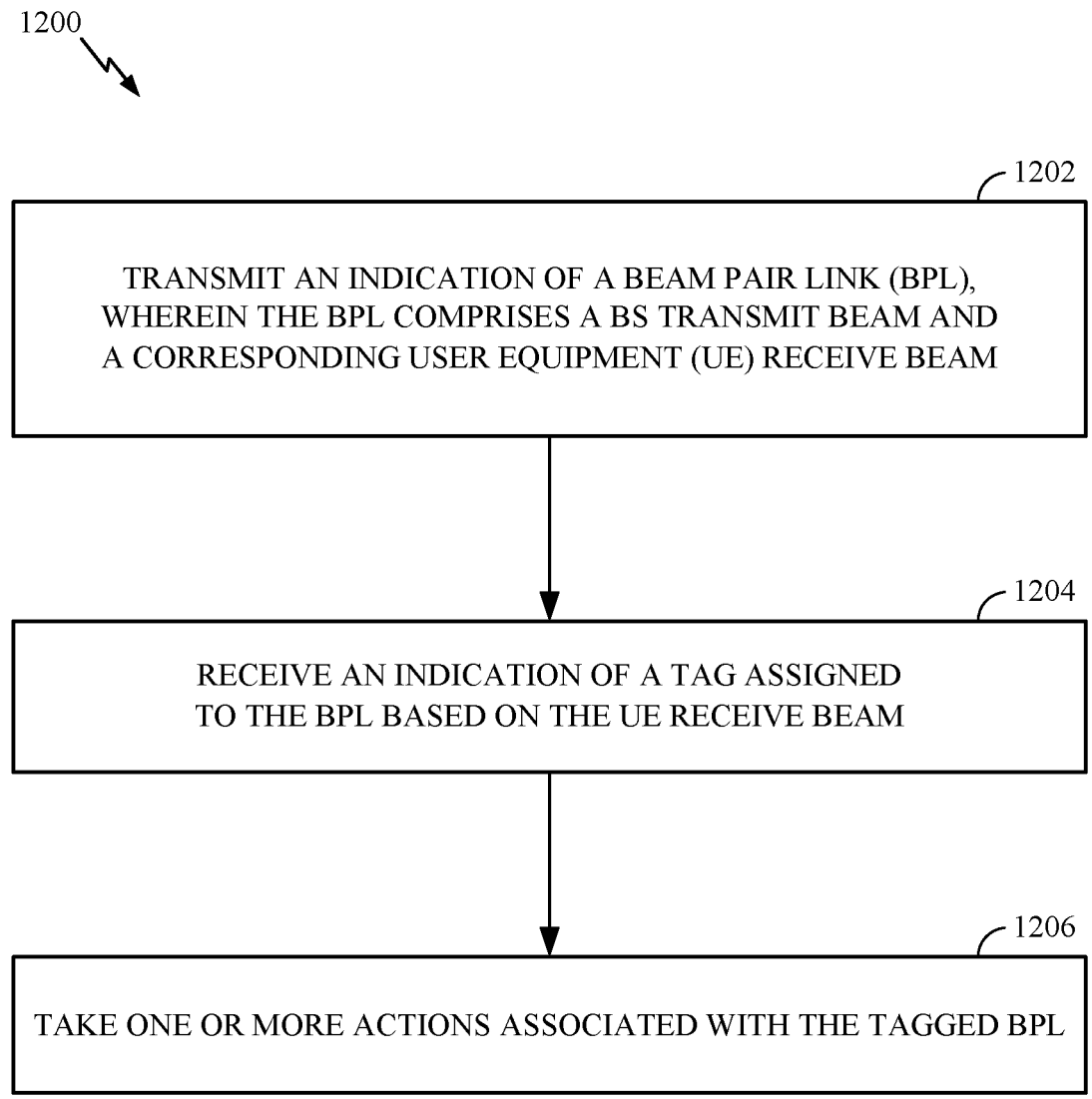
FIG. 12 illustrates an example operations performed by a BS, in accordance with aspects of the present disclosure.

FIG. 12 illustrates example operations 1200 which may be performed by a BS in accordance with aspects of the present disclosure. At 1202, the BS may transmit an indication of a beam pair link (BPL), wherein the BPL comprises a BS transmit beam and a corresponding user equipment (UE) receive beam. At 1204, the BS receives an indication of a tag assigned to the BPL based on the UE receive beam. At 1206, the BS takes one or more actions associated with the tagged BPL.

According to aspects, the BS receives, from the UE, an indication of the tagged BPL. According to aspects, taking the one or more actions includes transmitting signaling in accordance with the BPL. According to aspects, the tag includes a beam indication.

According to aspects, taking the one or more actions includes transmitting a downlink assignment indicating beam refinement of the BS transmit beam of the tagged BPL such as a P2 procedure. During the refinement, the BS may transmit signaling, using one or more neighboring beams of the BS transmit beam and the BS may receive a recommendation for an updated BS transmit beam corresponding to the UE receive beam of the tagged BPL, wherein the updated BS transmit beam and the corresponding UE receive beam are assigned the tag.

According to aspects, taking the one or more actions includes transmitting a downlink assignment indicating beam refinement of the UE receive beam of the tagged BPL, such as a P3 procedure. During the refinement, the BS may transmit signaling using the BS transmit beam and may receive an updated tag, which maybe a new or the old tag corresponding to the BS transmit beam of the tagged BPL. The updated UE receive beam and the corresponding BS transmit beam are assigned one of the tag or an updated tag. According to aspects, the BS may transmit an indication for the updated tag in response to the updated UE receive beam and may receive the updated tag assigned to the updated UE receive beam and BS transmit beam.

According to aspects, taking the one or more actions associated with the tagged BPL includes receiving an indication of the tagged BPL in response to at least one of: a new BPL or an established BPL sharing a same UE receive beam with the new BPL. According to aspects, taking the one or more actions associated with the tagged BPL comprises signaling to the UE removal of a tag and its current association to one or more BPLs wherein the removed tag is available for future assignment to one or more new BPLs.

Figure 13:
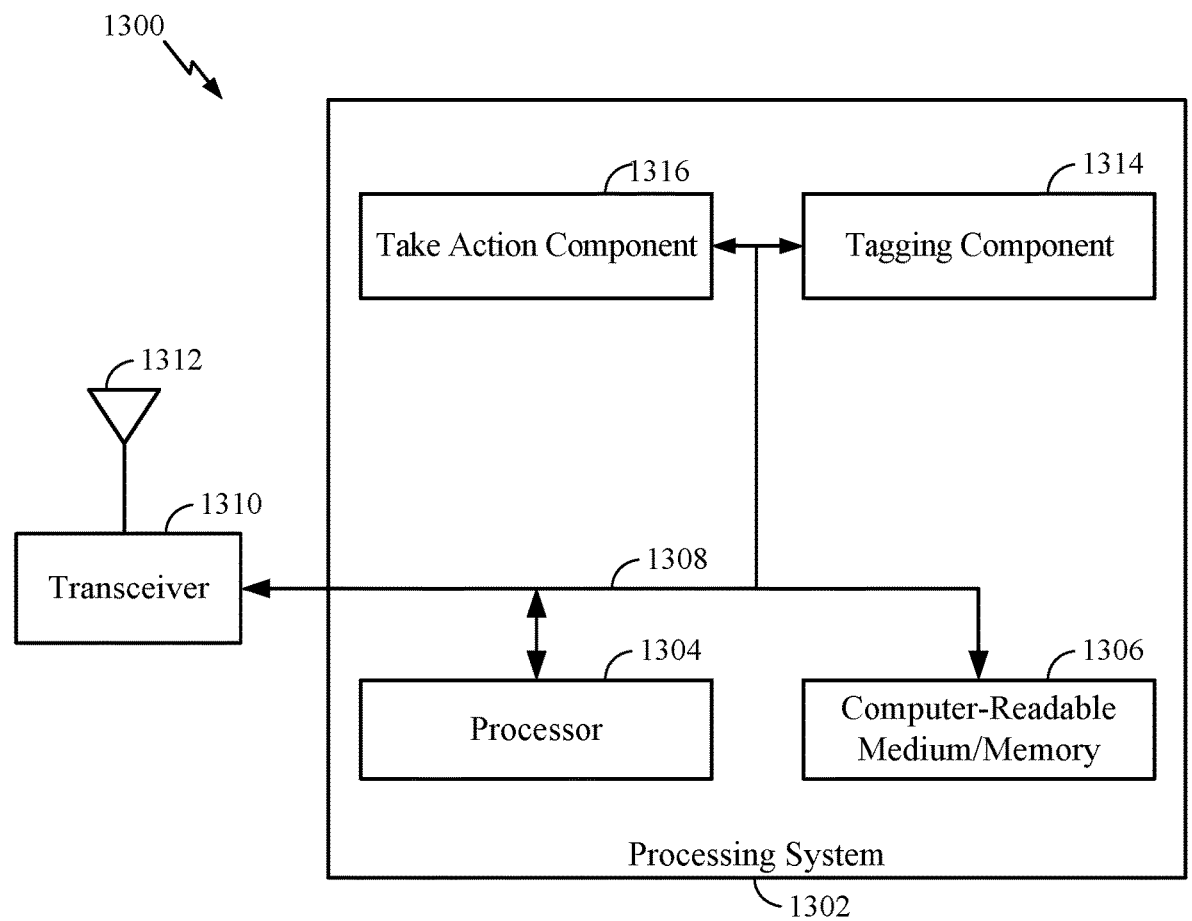
FIG. 13 illustrates a communications device that may include various components configured to perform operations for the techniques disclosed herein in accordance with aspects of the present disclosure.

FIG. 13 depicts a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1310. The transceiver 1310 is configured to transmit and receive signals for the communications device 1300 via an antenna 1312, such as the various signals described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1306 via a bus 1308. In certain aspects, the computer-readable medium/memory 1306 is configured to store computer-executable instructions that when executed by processor 1304, cause the processor 1304 to perform the operations illustrated in FIG. 11 or other operations for performing the various techniques discussed herein.

In certain aspects, the processing system 1302 further includes a tagging component 1314 and a taking action component 1316 for performing the operations illustrated in FIG. 11. In certain aspects, the processing system 1302 includes one or more of a determining component, indicating component, updating component, making a removed tag unavailable component, and/or other components configured to perform the operations described herein. The components 1314 and 1316 (and other non-illustrated components) may be coupled to the processor 1304 via bus 1308. In certain aspects, the components 1314 and 1316 (and other non-illustrated components) may be hardware circuits. In certain aspects, the components 1314 and 1316 (and other non-illustrated components) may be software components that are executed and run on processor 1304.

Figure 14:
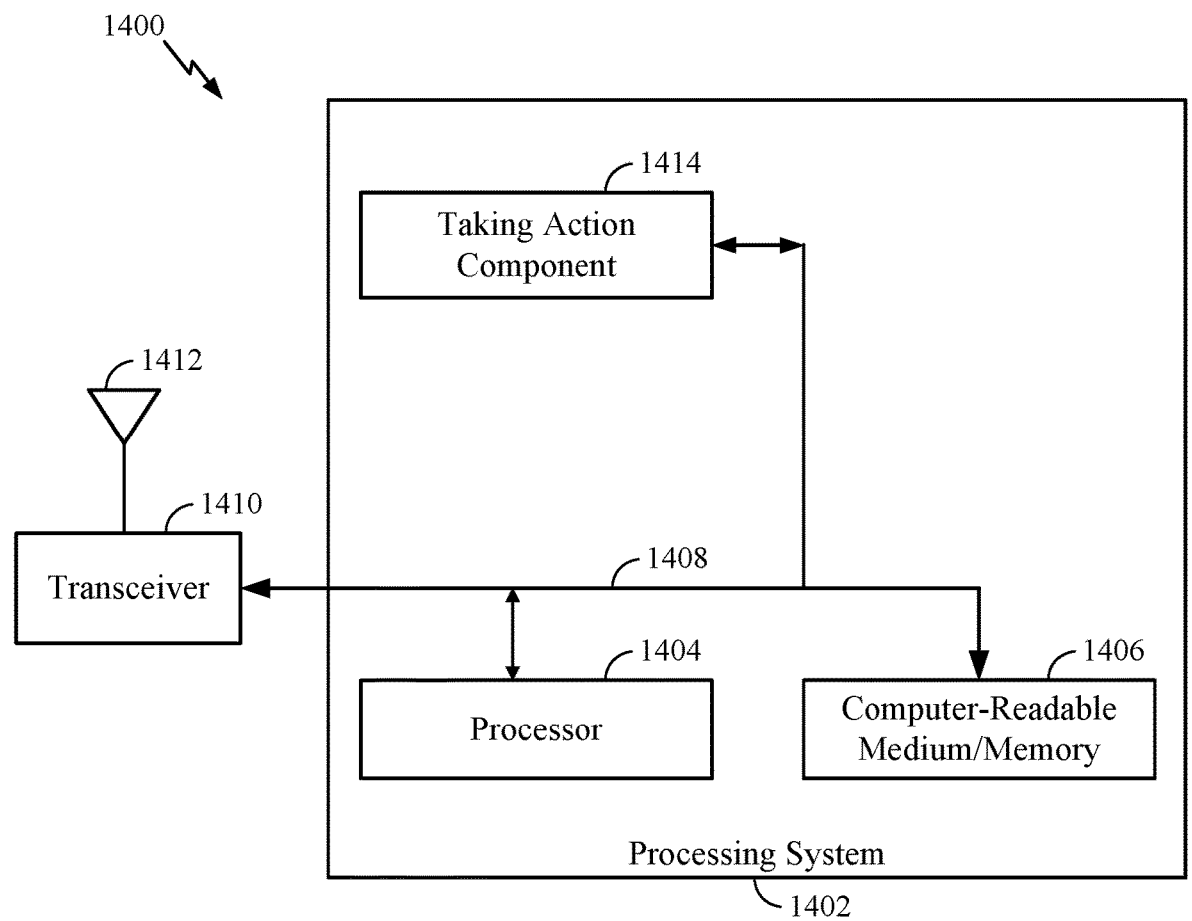
FIG. 14 illustrates a communications device that may include various components configured to perform operations for the techniques disclosed herein in accordance with aspects of the present disclosure.

FIG. 14 depicts a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1410. The transceiver 1410 is configured to transmit and receive signals for the communications device 1400 via an antenna 1412, such as the various signals described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1406 via a bus 1408. In certain aspects, the computer-readable medium/memory 1406 is configured to store computer-executable instructions that when executed by processor 1404, cause the processor 1404 to perform the operations illustrated in FIG. 12 or other operations for performing the various techniques discussed herein.

In certain aspects, the processing system 1402 further includes a taking action component 1414 for performing the operations illustrated in FIG. 12. In certain aspects, the processing system 1402 includes one or more of other (non-illustrated components) configured to perform the operations described herein. The component 1414 (and other non-illustrated components) may be coupled to the processor 1404 via bus 1408. In certain aspects, the component 1414 (and other non-illustrated components) may be hardware circuits. In certain aspects, the component 1414 (and other non-illustrated components) may be a software component that is executed and run on processor 1404.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving an indication of a beam pair link (BPL), wherein the BPL comprises a base station (BS) transmit beam and a corresponding UE receive beam;
   assigning a tag to the BPL, wherein the tag assigned to the BPL is a function of the UE receive beam; and
   taking one or more actions associated with the tagged BPL.

2. The method of claim 1, wherein taking the one or more actions comprises:
   transmitting, to the BS, an indication of the tagged BPL.

3. The method of claim 1, wherein taking the one more actions comprises:
   receiving signaling in accordance with the BPL.

4. The method of claim 1, wherein taking the one or more actions comprises:
- receiving a downlink transmission indicating beam refinement of the BS transmit beam of the tagged BPL;
- during the refinement, receiving signaling, transmitted from one or more neighboring beams of the BS transmit beam, using the UE receive beam;
- determining a signal quality associated with transmissions from one or more of the neighboring beams of the BS transmit beam; and
- indicating to the BS a recommended BS transmit beam corresponding to the UE receive beam of the tagged BPL based, at least in part, on the determined signal quality.

5. The method of claim 1, wherein taking the one or more actions comprises:
- receiving a downlink transmission indicating beam refinement of the UE receive beam of the tagged BPL;
- during the refinement, receiving signaling from the BS transmit beam via one or more receive beams neighboring the corresponding UE receive beam of the BPL;
- determining a signal quality associated with one or more of the neighboring beams of the UE receive beam; and
- updating the UE receive beam corresponding to the BS transmit beam of the tagged BPL based at least in part, on the determined signal quality.

6. The method of claim 5, further comprising:
- determining whether a different tag is needed in response to the updated UE receive beam;
- in response to determining a different tag is needed, computing the different tag;
- indicating the different tag to the BS; and
- assigning the different tag to the updated UE receive beam and BS transmit beam.

7. The method of claim 6, wherein the different tag comprises one of: a new tag or a currently-used tag.

8. The method of claim 1, wherein taking one or more actions associated with the tagged BPL comprises:
- transmitting, to the BS, an indication of the tagged BPL in response to at least one of: a new BPL or an established BPL sharing a same UE receive beam with the new BPL.

9. The method of claim 1, wherein taking one or more actions associated with the tagged BPL comprises:
- receiving, from the BS, a message to remove a tag and its current association to one or more BPLs; and
- in response to the message, making the removed tag available for assignment to one or more new BPLs.

10. A method for wireless communication by a base station (BS), comprising:
- transmitting an indication of a beam pair link (BPL), wherein the BPL comprises a BS transmit beam and a corresponding user equipment (UE) receive beam;
- receiving an indication of a tag assigned to the BPL, wherein the tag of assigned to the BPL is a function of the UE receive beam; and
- taking one or more actions associated with the tagged BPL.

11. The method of claim 10, receiving the indication of the tag comprises:
- receiving, from the UE, an indication of the tagged BPL.

12. The method of claim 10, wherein taking the one more actions comprises:
- transmitting signaling in accordance with the BPL.

13. The method of claim 12, wherein the tag comprises a beam indication.

14. The method of claim 10, wherein taking the one or more actions comprises:
- transmitting a downlink assignment indicating beam refinement of the BS transmit beam of the tagged BPL;
- during the refinement, transmitting signaling, using one or more neighboring beams of the BS transmit beam; and
- receiving a recommendation for an updated BS transmit beam corresponding to the UE receive beam of the tagged BPL, wherein the updated BS transmit beam and the corresponding UE receive beam are assigned the tag.

15. The method of claim 10, wherein taking the one or more actions comprises:
- transmitting a downlink assignment indicating beam refinement of the UE receive beam of the tagged BPL;
- during the refinement, transmitting signaling using the BS transmit beam; and
- receiving an updated tag, which maybe a new or old tag corresponding to the BS transmit beam of the tagged BPL, wherein the updated UE receive beam and the corresponding BS transmit beam are assigned one of the tag or an updated tag.

16. The method of claim 15, further comprising:
- transmitting an indication for the updated tag in response to the updated UE receive beam; and
- receiving the updated tag assigned to the updated UE receive beam and BS transmit beam.

17. The method of claim 10, wherein taking one or more actions associated with the tagged BPL comprises:
- receiving an indication of the tagged BPL in response to at least one of: a new BPL or an established BPL sharing a same UE receive beam with the new BPL.

18. The method of claim 10, wherein taking the one or more actions associated with the tagged BPL comprises:
- signaling to the UE removal of a tag and its current association to one or more BPLs wherein the removed tag is available for future assignment to one or more new BPLs.

19. An apparatus for wireless communication by a user equipment (UE), comprising:
- means for receiving an indication of a beam pair link (BPL), wherein the BPL comprises a base station (BS) transmit beam and a corresponding UE receive beam;
- means for assigning a tag to the BPL, wherein the tag assigned to the BPL is a function of the UE receive beam; and
- means for taking one or more actions associated with the tagged BPL.

20. The apparatus of claim 19, wherein the means for taking the one or more actions comprises:
- means for transmitting, to the BS, an indication of the tagged BPL.

21. The apparatus of claim 19, wherein the means for taking the the one more actions comprises:
- means for receiving signaling in accordance with the BPL.

22. The apparatus of claim 19, wherein the means for taking the one or more actions comprises:
- means for receiving a downlink transmission indicating beam refinement of the BS transmit beam of the tagged BPL;
- during the refinement, means for receiving signaling, transmitted from one or more neighboring beams of the BS transmit beam, using the UE receive beam;
- means for determining a signal quality associated with transmissions from one or more of the neighboring beams of the BS transmit beam; and means for indicating to the BS a recommended BS transmit beam corresponding to the UE receive beam of the tagged BPL based, at least in part, on the determined signal quality.

23. The apparatus of claim 22, wherein the means for taking the one or more actions comprises:
   means for receiving a downlink transmission indicating beam refinement of the UE receive beam of the tagged BPL;
   during the refinement, means for receiving signaling from the BS transmit beam via one or more receive beams neighboring the corresponding UE receive beam of the BPL;
   means for determining a signal quality associated with one or more of the neighboring beams of the UE receive beam; and
   means for updating the UE receive beam corresponding to the BS transmit beam of the tagged BPL based at least in part, on the determined signal quality.

24. The apparatus of claim 23, further comprising:
   means for determining whether a different tag is needed in response to the updated UE receive beam;
   in response to determining a different tag is needed, means for computing the different tag;
   means for indicating the different tag to the BS; and
   means for assigning the different tag to the updated UE receive beam and BS transmit beam.

25. The apparatus of claim 24, wherein the different tag comprises one of: a new tag or a currently-used tag.

26. An apparatus for wireless communication by a base station (BS), comprising:
   means for transmitting an indication of a beam pair link (BPL), wherein the BPL comprises a BS transmit beam and a corresponding user equipment (UE) receive beam;
   means for receiving an indication of a tag assigned to the BPL, wherein the tag assigned to the BPL is a function of the UE receive beam; and
   means for taking one or more actions associated with the tagged BPL.

27. The apparatus of claim 26, wherein the means for taking the one or more actions comprises:
   means for transmitting a downlink assignment indicating beam refinement of the BS transmit beam of the tagged BPL;
   during the refinement, means for transmitting signaling, using one or more neighboring beams of the BS transmit beam; and
   means for receiving a recommendation for an updated BS transmit beam corresponding to the UE receive beam of the tagged BPL, wherein the updated BS transmit beam and the corresponding UE receive beam are assigned the tag.

28. The apparatus of claim 26, wherein the means for taking the one or more actions comprises:
   means for transmitting a downlink assignment indicating beam refinement of the UE receive beam of the tagged BPL;
   during the refinement, means for transmitting signaling using the BS transmit beam; and
   means for receiving an updated tag, which maybe a new or old tag corresponding to the BS transmit beam of the tagged BPL, wherein the updated UE receive beam and the corresponding BS transmit beam are assigned one of the tag or an updated tag.

29. The apparatus of claim 28, further comprising:
   means for transmitting an indication for the updated tag in response to the updated UE receive beam; and
   means for receiving the updated tag assigned to the updated UE receive beam and BS transmit beam.

30. The apparatus of claim 26, wherein the means for taking the one or more actions associated with the tagged BPL comprises:
   means for signaling to the UE removal of a tag and its current association to one or more BPLs wherein the removed tag is available for future assignment to one or more new BPLs.

* * * * *